July 23, 1935.     G. M. LESSARD     2,008,961
HEAT ACTUATED AND MANUALLY OPERATED VALVE
Filed Oct. 29, 1932
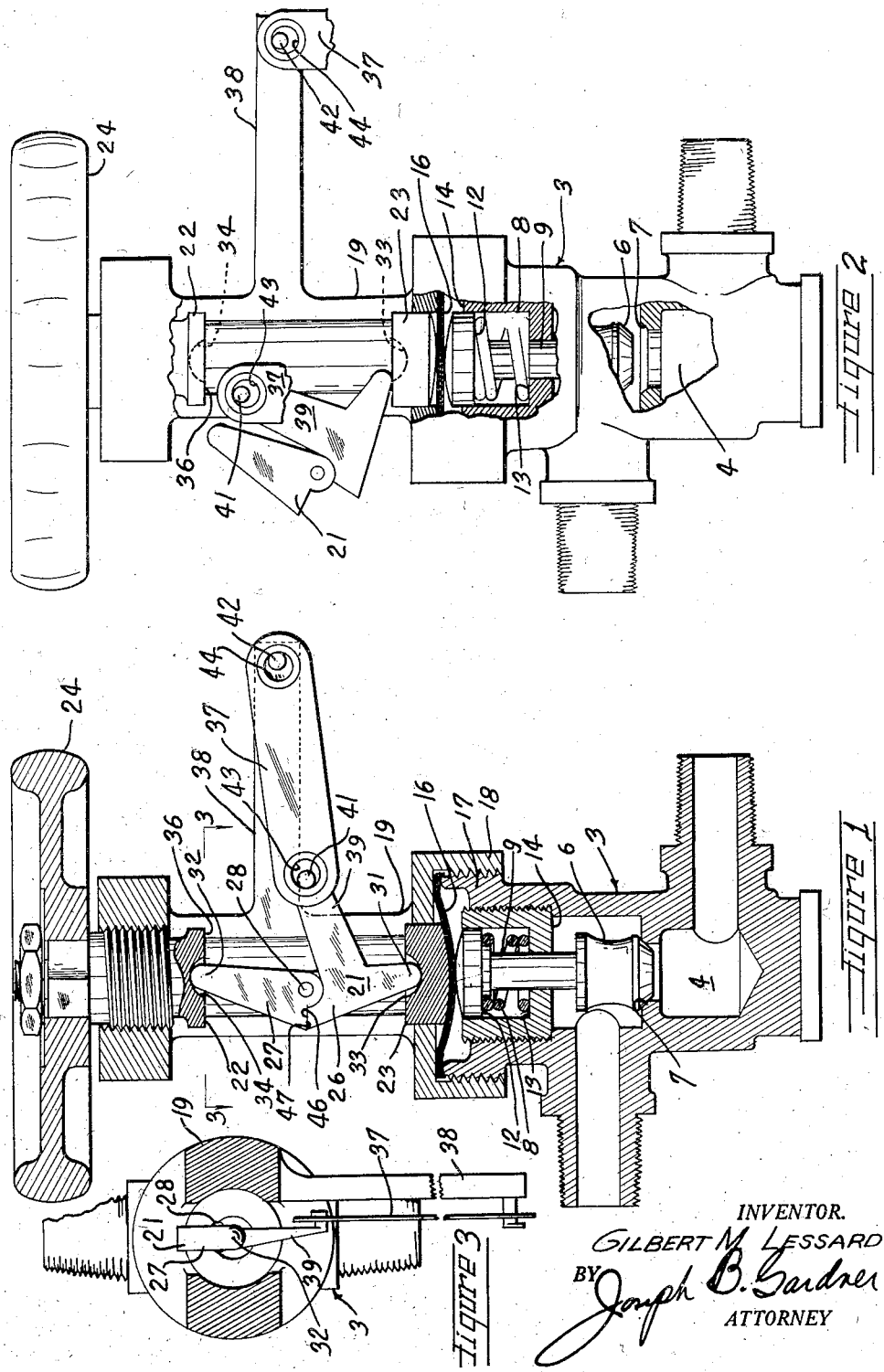
INVENTOR.
GILBERT M. LESSARD
BY Joseph B. Gardner
ATTORNEY Patented July 23, 1935

2,008,961

UNITED STATES PATENT OFFICE 2,008,961

HEAT ACTUATED AND MANUALLY OPERATED VALVE

Gilbert M. Lessard, Berkeley, Calif., assignor of one-half to Harry A. Badorf, Berkeley, Calif.

Application October 29, 1932, Serial No. 640,157

4 Claims. (Cl. 137—161)

The invention relates to a heat actuated and manually operated valve and in its present embodiment particularly to an arrangement affording, in addition to the manual control of the valve, an automatic actuation, such as by the fusing of a fusible link, to effect an opening of the valve in case the temperature surrounding the valve becomes excessive.

An object of the invention is to provide a valve arrangement of the character described in which a great force may be exerted to hold the valve in a desired position against the resistance of the fusible link without causing any undue strain on such link.

Another object of the invention is to provide a valve arrangement of the character described in which the fusible link will be visible and accessible from the exterior of the device.

A further object of the invention is to provide a valve of the character described which may be readily operated manually while set for automatic actuation.

The invention possesses other objects and features of advantage, some of which, with the foregoing, will be set forth in the following description of the preferred form of the invention which is illustrated in the drawing accompanying and forming part of the specification. It it to be understood, however, that variations in the showing made by the said drawing and description may be adopted within the scope of the invention as set forth in the claims.

Referring to said drawing:

Figure 1 is a longitudinal sectional view of a valve equipped with the features of my invention and showing it in closed position and set for automatic operation.

Figure 2 is an elevational view partially in section with the valve moved to open position.

Figure 3 is a cross-sectional view of the valve taken on the line 3—3 of Figure 1.

The means of my invention is utilized for normally holding a valve in closed position and it may be automatically actuated or manually operated to assume an open position. In the form of valve shown, the latter is particularly adapted for use in connection with refrigeration systems where it becomes necessary, as in case of fire, to open the refrigerant line and allow the refrigerant fluid to escape.

As illustrated in the drawing, the valve as a unit comprises a body 3 providing a passage 4 therethrough which may be opened or closed by the engagement or disengagement of a valve plug 6 with a valve seat 7 provided across said passage. The plug 6 is urged to a position spaced from the seat by means of a spring 8 which encircles the stem 9 of the valve and is interposed between a shoulder head 12 thereon and a flange 13 formed on a cup-shaped member 14 having a screw threaded connection with the body 3. A diaphragm 16 positioned at the free end of the stem, and secured in place between the threaded end 17 of the body and a correspondingly threaded portion 18 of a yoke member 19, serves to seal the interior of the body and provides a closure therefor displaceable with the stem.

Retention of the valve in a depressed position, that is for closing the passage 4, is arranged to be effected through means of a collapsible supporting column 21 positionable between a screw 22 and a centering piece 23 guided in the yoke and movable with the diaphragm. With the column held in extended relation, the screw which is conveniently provided with a hand wheel 24, may be rotated in the yoke to force the diaphragm downwardly and hold the valve plug against the seat against the resistance of spring 8. However, as may be readily seen, should the supporting column 21 collapse while thus disposed, the pressure against the spring will be removed so that, entirely independent of any retraction of the screw 22, the valve will under the action of said spring move to an open position and thereby permit the free flow of fluid through the valve passage.

As here shown, the supporting column 21 is formed of arms or sections 26 and 27 which are connected together by means of a pivot 28 and having their free ends in the form of points 31 and 32 arranged to rest in recesses 33 and 34 respectively provided in the diaphragm engaging piece 23 and the inner end 36 of the screw. When, as clearly shown in Figure 1, the sections are in fully extended relation, the pivot 28 is somewhat out of alignment with the points 31 and 32, so that without some means of retaining the sections extended, the column 21 would, upon pressure being exerted inwardly against the ends thereof, collapse and become ineffective for use in holding the valve closed as aforesaid. Accordingly means are provided, including a fusible element, for retaining the column against collapse while it is desired to maintain the valve depressed. As here shown a fusible link 37 is utilized for this purpose, and as will be clear from the drawing, one end of the link is arranged to be attached to an extension 38 of the yoke while the other end is adapted for attachment to an extension 39 of one of the arms. The column as aforesaid is designed to assume an extended position with the pivot in somewhat offset relation to a line intersecting the contact points 31 and 32, and the fusible link therefor, which is to be under tension, is arranged for positioning at the side of the column most remote from the pivot point. In this manner, as will now be clear, when the column is operatively extended and inserted in position between the screw and diaphragm, the link 37 will hold the column extended so that the screw may be rotated sufficiently to force the valve into as tight engagement with the seat as desired. On the other hand, should it be desired to open the valve manually when thus closed, it is merely necessary to rotate the screw in a reverse direction. Again, assuming the valve to be in closed position, should the temperature about the valve reach a point in excess of a predetermined value, the link will fuse whereby the column under the action of the spring will not only collapse but will be expelled from position in the valve and thus leave the diaphragm to ascend free and clear of any obstruction as indicated in Figure 2.

A simple manner of attaching the fuse to the column and yoke extensions is afforded by providing projections 41 and 42 thereon which are engageable in openings 43 and 44 formed in the link. It is also desirable that the arms be each provided with cooperating stop portions 46 and 47 which assume the compressive force exerted against the column while the valve is in closed position.

It should be noted that since the offset of the pivot with respect to the contact points of the column is only a very small amount, a comparatively very great force may be exerted by the screw against the column to keep the valve closed, without any appreciable strain on the fusible link, thus insuring an effective closure of the valve without danger to the automatic actuating feature of the device.

An important feature of the arrangement is also had in view of the fact that no springs are exposed, and yet the fusible link and the column are always in full view and readily accessible for inspection or replacement.

I claim:

1. In a valve mechanism, a body having a passageway therethrough and a valve member movable to a position closing said passageway and to a position opening said passageway, means urging said member to one of said positions, a pair of members forming a collapsible column for retaining said valve member in the other of said positions against the action of said means, and a fusible element maintaining said column against collapse and means operable to move said column and valve member to one of said positions and to permit the valve member to be moved to the other of said positions.

2. In a valve mechanism, a body having a valve member movable to positions permitting or restraining the fluid flow therethrough, a support, a spring urging said member to one of said positions, a pair of arms having pivotal connection with each other and extending from said connection to engage said support and said valve member to hold said member in the other of said positions against the action of said spring, said support being manually adjustable to and from said valve member whereby the latter may be moved by the support to one of said positions or permitted to move to the other of said positions, said pivotal connection being out of alignment with the points of engagement of said arms with the support and valve member thereby rendering said pair of arms collapsible, and a fusible element maintaining said arms against collapse.

3. In a device of the character described, a casing having a passageway and a bore opening at an end of said casing and communicating with said passageway, a hollow member in said bore having a perforate end disposed adjacent said passageway, a valve member in said passageway and having a stem portion extending through said perforate end, a helical spring surrounding said stem portion and supported on said perforate end and urging said valve member to a position permitting flow of fluid through said passageway, a head portion on said stem portion engaged by said spring, a diaphragm positioned across said casing end and engaging said head portion, a cap on said casing and sealing said diaphragm to the casing and having an opening therethrough, a slide member carried in said cap opening and supported on said diaphragm, an extension on said cap member and providing a threaded bore, an actuator member adjustably mounted in said last named bore, a pair of arms engaged by said actuator and slide members and pivoted to each other at a point intermediate of and out of alignment with the points of engagement with said members and movable with said actuator member to position said valve member to permit or restrain the flow of fluid through said passageway, and a fusible element secured to said extension and one of said pair of arms and maintaining said arms against collapse and movement of said valve member under the action of said spring.

4. In a device of the character described, a casing having a passageway therethrough and a longitudinally extending bore opening at an end of said casing and communicating with said passageway, a cup shaped member threaded into said bore and having a perforate end disposed adjacent said passageway, a valve member in said passageway and having a stem portion extending through said perforate end and into said cup member, a helical spring surrounding said stem portion and supported on said perforate end and urging said valve member to position permitting flow of fluid through said passageway, a head portion on said stem portion slidably carried by said cup member and engaged by said spring, a diaphragm positioned across said casing end and engaging said head portion, a cap threadably engaged on said casing and sealing said diaphragm at the end of said casing and having an opening therethrough, a slide member carried in said cap opening and supported on said diaphragm, an extension on said cap member extending longitudinally from said bore and providing spaced from said slide member a threaded bore, an actuator member adjustably mounted in said last named bore, a pair of arms engaged at their ends by said actuator and slide members and pivoted to each other at a point intermediate of and out of alignment with the points of engagement with said members and movable with said actuator member to position said valve member to permit or restrain the flow of fluid through said passageway, a laterally extending projection on said extension, and a fusible element secured to said projection and one of said pair of arms and maintaining said arms against collapse and movement of said valve member under the action of said spring.

GILBERT M. LESSARD.